United States Patent Office 3,546,165
Patented Dec. 8, 1970

3,546,165
SOLUBLE HIGH-MELTING, THERMALLY STABLE LINEAR POLYESTERS
Paul Winthrop Morgan, West Chester, Pa., assignor to E. I. du Pont de Nemours and Company, Wilmington, Del., a corporation of Delaware
No Drawing. Filed Feb. 1, 1966, Ser. No. 523,927
Int. Cl. C08g *17/05, 17/08, 33/10*
U.S. Cl. 260—47
4 Claims

ABSTRACT OF THE DISCLOSURE

The application discloses certain gem-bisphenols and soluble, high-melting, thermally stable, linear film- and fiber-forming polycarbonate polymers and polyester polymers prepared from gem-bisphenols whose phenylene rings are connected to bulky planar fused ring bridging radicals and to shaped articles prepared from these polymers. At least 80% of the repeating units of the polycarbonates are of the formula:

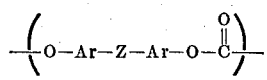

while at least 80% of the repeating units of the polyesters are of the formula:

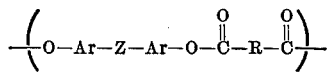

wherein Ar represents a p-phenylene radical; Z represents a gem-bivalent radical having from 1 to 2 aromatic hydrocarbon rings, and the halo-, phenyl, and lower alkyl derivatives thereof, each of which is fused to a gem-bivalent carbon-containing non-aromatic ring of 5 to 6 carbon atoms that may be lower alkyl substituted, with the proviso that one of the carbon atoms in said non-aromatic ring may be replaced by oxygen or may bear an oxo radical; R represents a divalent organic radical containing from 4 to 15 carbon atoms and which may also contain from 1 to 4 atoms selected from the group of halogen, oxygen and sulfur, or mixtures of these radicals.

---

This invention relates to certain new and useful gem-bisphenols and to high-melting polymers prepared from gem-bisphenols whose phenylene rings are connected to bulky, planar, fused ring bridging radicals and to shaped articles prepared from these polymers.

The present invention provides soluble, high-melting, thermally-stable linear polycarbonates and polyesters. At least 80% of the repeating units of the polycarbonates are of the formula:

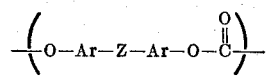

while at least 80% of the repeating units of the polyesters are of the formula:

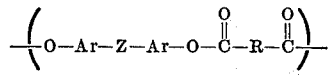

wherein Ar represents a p-phenylene radical; Z represents a gem-bivalent radical having from 1 to 2 aromatic hydrocarbon rings, and the halo-, phenyl, and lower alkyl derivatives thereof, each of which is fused to a gem-bivalent carbon-containing non-aromatic ring of 5 to 6 carbon atoms that may be lower alkyl substituted, with the proviso that one of the carbon atoms in said non-aromatic ring may be replaced by oxygen or may bear an oxo radical; R represents a divalent organic radical containing from 4 to 15 carbon atoms and which may also contain from 1 to 4 atoms selected from the group of halogen, oxygen, and sulfur; or mixtures of these radicals. It will be understood that for the purpose of this invention Z need not be the same in every repeating unit. Similarly, R need not be the same in each repeating unit. In addition, 1 to 20% of the repeating units in the polymer chains may be, in the case of polycarbonates, as follows:

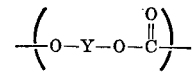

and in the case of polyesters as follows:

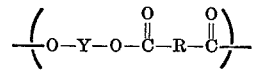

wherein R is as defined above and Y is as defined herein. The polymers of the invention have an inherent viscosity of at least about 0.40 when determined at 30° C. from a 0.5% solution of the appropriate polymer in a mixture of sym-tetrachloroethane and phenol (40/60 by weight).

The polymers of this invention are high molecular weight, film- and fiber-forming materials whose combined characteristics of solubility in low boiling solvents, high softening temperature, and high glass transition temperature (Tg) have hitherto been attainable only in comparable polymers containing a polar unit described by Morgan in J. Polymer Sci: Part A, v. 2, pp. 437–459 (1964), or a complex three-dimensional unit cross-wise of the polymer chain (see French Pat. 1,376,466, Sept. 21, 1964). The thermal performances of the polymers of the present invention are unexpectedly enhanced over those exhibited by related polymers not possessing the aforementioned polar or three-dimensional units.

The linear polycarbonates of this invention can be prepared by reacting a carbonic acid halide (e.g., phosgene) with a bisphenol from the group represented by the formula (1) 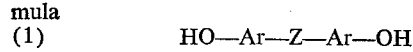

wherein Ar and Z have the significance set forth hereinbefore, or with mixtures of such bisphenols. In addition to bisphenols of Formula 1 there may be present in the reaction mixture 1 to 20% (mole basis, bisphenolic reactants) of bisphenols represented by the formula (2)                HO—Y—OH wherein Y represents a member selected from the groups of

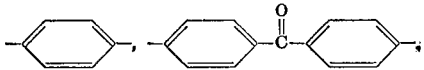

and

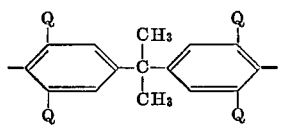

radicals, Q representing a hydrogen atom, a bromide radical, or a chloride radical.

It is apparent that when phosgene is condensed with a mixture of the bisphenols represented by (1) or a mixture of those of (1) and (2), above, the resulting polycarbonate will have randomly recurring residues derived from the various bisphenols. Alternatively, the random polycarbonates of this invention containing up to 20% of —Y— residues can be prepared from the reaction of appropriate quantities of the bisphenols represented by (1) and (2) with the stoichiometric amounts of the bischloroformates of the same or different bisphenols by procedures known in the art. Reacting the bischloroformate of a formula (1) bisphenol with the equivalent amount of the bisphenol from which it was derived or with an equivalent amount of different formula (1) bisphenol will afford a polycarbonate having a regularly recurring residue derived from the bisphenol or bisphenols utilized.

The polyesters of the invention may similarly contain 1 to 20% (mole basis, bisphenolic component) of —Y— residues derived from use of the above-cited HO—Y—OH reactant.

Most conveniently the polyesters of the present invention are prepared from nearly equivalent amounts of the appropriate bisphenol and diacyl halide by interfacial polymerization and the polycarbonates by interfacial polymerization of the bisphenol and phosgene gas by means of, for example, the general procedures described by Morgan, supra, using an accelerator such as, for example, tetraethylammonium chloride and inert organic liquids such as, for example, 1,2-dichloroethane, as solvents for the diacyl halides. In employing in these procedures the bulky, planar-bridged gem-bisphenols necessary to yield the novel polymers of this invention, it is frequently found that the phenoxide displays low solubility in water. Also, the addition of the accelerator to the alkaline solution often causes further precipitation. These problems can be avoided in many instances by using a 100 percent excess of sodium hydroxide; the phenol frenquently becomes completely soluble by this treatment and is not precipitated by the accelerator.

Because excess alkali causes increased hydrolysis of the diacid halide, the polyesters of this invention prepared from aliphatic diacid halides are obtained in higher molecular weights and sometimes greater yield, by adding an excess of diacid chloride in small increments after the initial polymerization is complete. Additional alkali is added if the system becomes neutral or acidic. A similar sequence is favorably employed in preparing polycarbonates of this invention, as is subsequently exemplified.

The Formula 1 bisphenols whose use is preferred in the preparation of the polymers of this invention may often be prepared by the acid catalyzed condensation of the appropriate ketone and phenol. The alternate condensation of the dichloride, prepared from the ketone and thionyl or phosphorus chlorides, and phenol under anhydrous conditions is often a useful route to the desired bisphenol when the direct dehydration reaction proceeds with difficulty.

Preferred among the bisphenols corresponding to Formula 1, above, which are useful in the present invention are 9,9-bis(4-hydroxphenyl)fluorene,
1,1-bis(4-hydroxyphenyl)-indane,
9,9-bis(4-hydroxyphenyl)xanthene,
10,10-bis(4-hydroxyphenyl)anthrone,
9,9-bis(4-hydroxyphenyl)phenanthrone.

Other useful bisphenols include phenolphthalan, 9,9-bis(4-hydroxphenyl)-9,10-dihydroanthracene,
9,9-bis(4-hydroxyphenyl)-10,10-diphenyl-9,10-dihydroanthracene,
3,3-bis(4-hydroxyphenyl)-4,5-benzodihydrofuran, and the like.

Formula 2 bisphenols which are useful for preparing the copolymers of this invention are hydroquinone, 2,2-bis(4-hydroxyphenyl)propane,
4,4'-dihydroxybenzophenone,
bis(4-hydroxyphenyl)sulfone,
1,1-bis(4-hydroxyphenyl)cyclohexane,
2,2-bis(3,5-dichloro-4-hydroxyphenyl)propane, and
2,2-bis(3,5-dibromo-4-hydroxyphenyl)propane.

The preferred difunctional acid halides which are employed in the preparation of the instant polymers have the structure

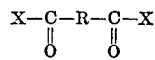

or

where X is halogen and R has the significance set forth hereinbefore. The dicarboxylic acid halides may be prepared from the corresponding dicarboxylic acid by any one of several well-known methods; the diacid chloride is usually preferred.

Preferred among the diacid chlorides are phosgene and those of the following dicarboxylic acids; isophthalic, terephthalic, 5-chloroisophthalic, 5-tert-butylisophthalic, bibenzoyl, bis(4-carboxyphenyl) ether, bis(4-carboxyphenyl)sulfone, dimethylmalonic, succinic, glutaric, adipic, suberic, azelaic, sebacic, undecandioic, dodecandioic, 1,3- and 1,4-cyclohexanedicarboxylic. In addition, mixtures of two or more of these diacids may be employed over the entire composition range.

In preferred polycarbonates and polyesters of the invention, R is hydrocarbon or halohydrocarbon of from 4 to 15 carbon atoms and Z is a gem-bivalent radical having two aromatic hydrocarbon rings, each of which is fused to a non-aromatic ring of 5 to 6 carbon atoms including the gem-bivalent carbon with the proviso that one carbon of said non-aromatic ring may be replaced by or substituted with an oxo radical. The singularly preferred polyester of this invention is poly[(9-fluorenylidene)di-p-phenylene terephthalate] which comprises the recurring structural unit

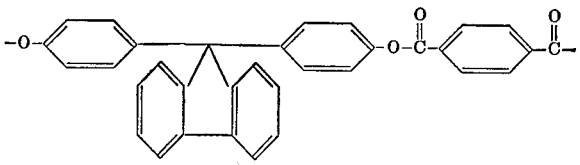

the preferred polycarbonate is poly[(9-fluorenylidene)dip-phenylene carbonate] which comprises the recurring structural unit

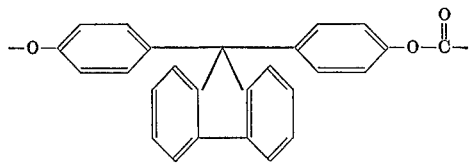

Although they are not necessary in the preparation of the polymers of this invention, various chain terminators may be employed in the polymerization processes utilized.

Among the suitable chain terminators are monofunctional compounds which can react with the acid chloride ends of these polymers such as alcohols (methyl alcohol, ethyl alcohol, isopropyl alcohol, phenol, etc.), amines (methylamine, ethylamine, butylamine, piperidine, dimethylamine, aniline, N-methylpiperazine, etc.), and monofunctional compounds which can react with the phenoxide ends of the polymers such as benzoyl chloride, butyryl chloride, 3-chlorobenzoyl chloride, benzyl chloride, trialkylsilyl chlorides, etc.

The polymers of this invention may be cast into clear, flexible films or extruded into filamentary forms from solutions containing about 15% to 30% by weight of the polymer dissolved in a solvent selected from the class consisting of chlorobromomethane, dichloromethane, sym-tetrachloroethane, pyridine, m-cresol, chloroform, 1,2-dichloroethane, tetrahydrofuran, trifluoroacetic acid or mixtures of the latter with various aliphatic chlorinated hydrocarbons such as those listed. Additional solvents for many of the polymers are 1-chloro-2-bromoethane, 1,1,2-trichloroethane, cyclohexanone, dioxane, dimethyl sulfoxide, dimethylacetamide, and tetramethylene sulfone. Films and coatings may also frequently be prepared at solution concentrations lower than the above range, for example, 5 to 10%. Those polymers softening below about 275° can be readily extruded or pressed at elevated temperatures into films, fibers or molded objects.

Fibers prepared from the polymers of this invention exhibit good thermal stability. For example, a fiber of the preferred poly[(9-fluorenylidene)di-p - phenylene terephthalate] remains essentially unchanged, except for assuming a small amount of coloration, after exposure for 100 hours in air at 300° C.

It will be seen that the polycarbonates of this invention display unexpectedly high softening and glass transition (Tg) temperatures when these data are contrasted to the comparable properties variously reported in U.S. Pat. 3,062,781; Ind. Eng. Chem. 51, 147 (1959); Ind. Eng. Chem. 51, 157 (1959); J. Poly. Sci., Part A, Vol. 2, 455 (1964) for polycarbonates prepared from 2,2-bis-(4-hydroxyphenyl)propane, 1,1 - bis(4 - hydroxyphenyl)-cyclohexane, and bis(4 - hydroxyphenyl)phenylmethane. Indeed, to achieve this combination of thermal properties in polycarbonates of the prior art, it has been necessary to employ bisphenols having either a three-dimensional structure bridging the phenylene rings of the bisphenol, such as reported in Ind. Eng. Chem., Product Research and Development, Vol. 2, 246–256 (December, 1963) for polycarbonates prepared from 4,4'-(2-norbornylidene)-diphenol and related compounds, or bisphenols having a bulky, polar group as part of their bridge structure, such as described in Morgan, supra, for a polycarbonate from phenolphthalein, for example. It is to be noted that the polycarbonate from the latter bisphenol will exhibit increased hydrolytic sensitivity due to the hydrolyzable lactone ring in the bridging group. The instant polycarbonates do not exhibit this enhanced hydrolytic sensitivity.

Likewise, the high softening temperatures and Tg values of the polyesters of this invention are observed to be unexpectedly high when contrasted to the related data reported for analogous polymers prepared from 2,2-bis(4-hydroxyphenyl)propane, 1,1-bis(4-hydroxyphenyl)cyclohexane, and bis(4-hydroxyphenyl)phenylmethane, as summarized in Morgan, supra.

The following non-limiting examples are illustrative of the practice of the preferred embodiment of this invention. In these examples, inherent viscosity ($\eta_{inh}$) has been determined in accordance with the following equation $$\eta_{inh} = \frac{\ln(\eta_{rel})}{(C)}$$

wherein ($\eta_{rel}$) represents the relative viscosity and (C) represents a concentration of 0.5 gram of the polymer in 100 ml. of the solution. The relative viscosity ($\eta_{rel}$) is determined by dividing the flow time in a capillary viscometer in a dilute solution of the polymer by the flow time for the pure solvent. The dilute solutions used herein for determining ($\eta_{rel}$) are of the concentration expressed by (C) above; the flow times are determined at 30° C. and, unless otherwise specified, are measured in a mixture of sym-tetrachloroethane and phenol (40/60 by weight). As used herein, the "polymer softening temperature" is defined as the lowest temperature at which a polymer sample, when placed upon a chrome-plated temperature-gradient bar under light pressure shows an observable change in rigidity or plasticity as evidenced by sintering, the formation of a pliable mass, adhesion to the bar, or distinct melting. As used herein for new materials, the polymer's glass transition temperature, abbreviated Tg, is defined as that temperature at which a dry polymer sample in powder form, as isolated from the polymerization mixture, shows on a first cycle an endothermic peak when heated under nitrogen in a differential thermal analysis apparatus at a programmed rate of temperature rise of 10° C. per minute. Filament tenacity, elongation, and modulus are coded as "T/E/Mi" and are in units of grams/denier, percent, and grams/denier, respectively. The terms work recovery and tensile recovery, coded as WR and TR, respectively, are reported in percent and are used as defined in Beaman and Cramer, J. Poly. Sci., Vol. 21, 228 (1956). The subscripts on WR and TR refer to the percent elongation (e.g., 3%, 5%). Tensile measurements are determined under room temperature conditions (e.g., 21.1° C. and 65% relative humidity).

EXAMPLE I

This example illustrates the preparation of 1,1-bis(4-hydroxyphenyl)indane.

1-indanone (26.8 g.; 0.2 mole), 76 g. of phenol (approximately 0.8 mole), 1 ml. of β-mercaptopropionic acid, and 126 ml. of concentrated hydrochloric acid are mixed and subsequently heated on a water bath (with stirring) for 7 hrs. The mixture becomes brownish-red as soon as the mercaptan is added and slowly becomes viscous as the reaction proceeds. The reaction mixture is removed from the heating bath and allowed to stand overnight at room temperature. It is then diluted with water, whereupon a gum and a yellow solid separate. The gum is extracted with 20% aqueous sodium hydroxide (2× 100 ml.) after which hydrochloric acid is added to the alkaline extractant solution to precipitate the bisphenol. This material is recrystallized twice from aqueous acetic acid to produce 5 g. of 1,1-bis(4-hydroxyphenyl)indane, M.P. 216°–217° C.

*Analysis.*—Calcd. for $C_{21}H_{18}O_2$ (percent): C, 83.41; H, 6.00. Found (percent): C, 83.02; H, 6.02.

EXAMPLE II

This example illustrates the preparation of 9,9-bis(4-hydroxyphenyl)fluorene.

Fluorenone (36 g.; 0.2 mole) is dissolved in 76 g. (0.8 mole) of molten phenol. β-Mercaptopropionic acid (1 ml.) is added and dry hydrogen chloride is then bubbled in for about 10 minutes. The system becomes very dark, but in 2–3 hrs. it suddenly clears and is quite viscous. This particular solution is allowed to stand two days.

The above-described solution is diluted with water to cause precipitation of a white solid, which is collected and washed. The product is further purified by dissolving it in alkali, reprecipitating it with concentrated hydrochloric acid, and washing. Crystallization of the dry material from toluene gives glassy needles and hard kernels. Mechanical separation and further crystallization gives no evidence that there are two products. The total yield of 9,9-bis(4-hydroxyphenyl)fluorene is 32.2 g., M.P. 224° C.

EXAMPLE III

This example illustrates the preparation of 10,10-bis(4-hydroxyphenyl)anthrone, the phenol employed in preparing the polymer of Example X infra.

Anthraquinone (20.0 g.), phenol (20.0 g.) and stannic chloride (25 g.) are placed in a flamed round-bottomed flask under nitrogen. The mixture is heated at 80° for 18 hrs., then diluted with water whereupon a precipitate forms. The precipitate is isolated, dissolved in aqueous sodium hydroxide, the solution filtered, and the filtrate acidified with concentrated hydrochloric acid. The resulting precipitate of 10,10-bis(4-hydroxyphenyl)anthrone is crystallized from ethanol as a slightly colored granular mass; 3.32 g., M.P. 330°. From acetic acid, glassy blades are obtained having the same melting point.

If the anthraquinone of this example is replaced with an equivalent amount of 1-chloroanthraquinone or 2-methylanthraquinone, there may be obtained the corresponding chloro- or methyl-substituted anthrone which can be polymerized with the dichloride of terephthalic acid to produce polyesters of the invention.

EXAMPLE IV

This example illustrates the preparation of 9,9-bis(4-hydroxyphenyl)xanthene, the phenol employed in preparing the polymer of Example XVIII, infra.

Xanthone (20 g.) is refluxed in 100 ml. of thionyl chloride for 5 hrs., then permitted to stand for 18 hrs., thereby forming 9,9-dichloroxanthene. The excess thionyl chloride is removed under vacuum; the residual product is washed with petroleum ether and dried under vacuum. The dichloride is then mixed with 42.2 g. of phenol and 0.5 ml. of β-mercaptopropionic acid and the mixture heated on a steam-bath for 48 hrs. The addition of water to the mixture yields a red oil. The oil is dissolved in aqueous sodium hydroxide and the resulting solution allowed to stand for a week, exposed to the atmosphere. A white powder gradually precipitates (5.4 g.).

This powder is recrystallized from warm acetic acid, adding water to slight turbidity, to form bright plates of 9,9-bis(4-hydroxyphenyl)xanthene, M.P. 241° C.

*Analysis.*—Calcd. for $C_{25}H_{18}O_3$ (percent): C, 81.94; H, 4.95. Found (percent): C, 81.99; H, 4.85.

If the xanthene of this example is replaced with an equivalent amount of 3-bromo-9-fluorenone, 2-iodo-9-fluorenone or 4-methyl-1-tetralone, other bisphenols corresponding to Formula 1 result.

Thus, in the first two instances, there may be obtained 3-bromo-9,9-bis(4-hydroxyphenyl)fluorene and 2-iodo-9,9-bis(4-hydroxyphenyl)fluorene which can be polymerized with the dichloride of terephthalic acid to produce polyesters of the invention.

EXAMPLE V

This example demonstrates the preparation of poly[(9-fluorenylidene)di-p-phenylene terephthalate] by interfacial polymerization.

9,9-bis(4-hydroxyphenyl)fluorene (3.50 g., 0.01 mole), 3.93 ml. of a 20% aqueous solution of sodium hydroxide (contains 0.8 g., 0.02 mole, of sodium hydroxide), and 1.5 g. of tetraethylammonium chloride monohydrate are dispersed in 120 ml. of water in a blender. To this dispersion is added quickly, with vigorous stirring, terephthaloyl chloride (2.03 g., 0.01 mole) in 30 ml. of 1,2-dichloroethane. Polymer quickly precipitates on the walls of the blender. After the ingredients are agitated for 5 min., an equal volume of hexane is stirred in and the precipitated polymer is collected, washed, and dried. The yield of poly[(9-fluorenylidene)di-p-phenylene terephthalate] is 4.44 g. (93%), $\eta_{inh}=1.40$, Tg.=381° C. The polymer does not soften below 400° C.

The polymer is soluble in chlorobromomethane and sym-tetrachloroethane. Clear, flexible films are cast from chlorobromomethane.

EXAMPLE VI

This example illustrates the preparation of poly[(1-indanylidene)di-p-phenylene terephthalate].

1,1-bis(4-hydroxyphenyl)indane (3.02 g., 0.01 mole), 3.93 ml. of a 20% aqueous solution of sodium hydroxide (contains 0.8 g., 0.02 mole, of sodium hydroxide), and 120 ml. of water are placed in a blender. To this is added 1.5 g. of tetraethylammonium chloride. Following the formation of a precipitate in this aqueous system, 10 ml. of 1,2-dichloroethane are added. The precipitate remains undissolved. Terephthaloyl chloride (2.03 g., 0.01 mole) in 40 ml. of 1,2-dichloroethane is added quickly, with vigorous agitation. The reactants are agitated for 5 minutes, after which an equal volume of hexane is stirred in and the precipitated polymer is collected, washed, and dried.

The yield of poly[(1-indanylidene)di-p-phenylene terephthalate] is 3.82 g. (88% yield), $\eta_{inh}=0.46$. The polymer exhibits a Tg.=335° C. and does not soften up to 360° C. It is readily soluble in tetrahydrofuran and 1,1,2-trichloroethane. Clear, flexible films of this polymer are cast from a tetrahydrofuran solution containing 5% solids.

EXAMPLE VII

This example illustrates the preparation of poly[(9-fluorenylidene)di-p-phenylene carbonate] and poly[(1-indanylidene)di-p-phenylene carbonate].

Into a blender jar are placed 9,9-bis(4-hydroxyphenyl) fluorene (3.50 g., 0.01 mole), 3.93 ml. of a 20% aqueous solution of sodium hydroxide, tetraethylammonium chloride monohydrate (1.5 g.), 30 ml. of 1,2-dichloroethane, and 120 ml. of water.

While these ingredients are stirred, phosgene is bubbled in from a cylinder until the system is slightly acid. Aqueous 20% sodium hydroxide (1 ml.) is added and phosgene is added again; the latter two steps are repeated a second time. The polymer dissolves in the dichloro ethane and separates as a viscous mass. The polymer is precipitated by adding 150 ml. of hexane with vigorous stirring. The course, fibrous product is isolated, washed thoroughly with water, and dried. The yield of poly[(9-fluorenylidene)di-p-phenylene carbonate] is 3.61 g. (96%), $\eta_{inh}=0.85$ (pyridine). The polymer does not melt below 360° but colors slightly at this temperature; Tg.=380° C. A clear, flexible film of this polycarbonate is cast from a pyridine solution containing 10% solids.

When 1,1-bis(4-hydroxyphenyl)indane is employed in the process described in the above paragraph in place of the fluorene-derived bisphenol, there is obtained a quantitative yield of poly[(1-indanylidene)di-p-phenylene carbonate], $\eta_{inh}=1.64$. This product exhibits a softening temperature of 295° C.; Tg.=219° C. A clear, tough film is cast from an 18% solution in tetrahydrofuran.

EXAMPLE VIII

This example illustrates the preparation of poly[(9-fluorenylidene)di-p-phenylene 5-chlorisophthalate] by interfacial polymerization.

9,9-bis(4-hydroxyphenyl)fluorene (3.50 g., 0.01 mole) 7.86 ml. of a 20% aqueous solution of sodium hydroxide, 1.5 g. of tetraethylammonium chloride monohydrate and 120 ml. of water are combined, warmed to effect complete solution, cooled and placed in a blender. To this solution is added quickly, with vigorous stirring, 5-chloroisophthaloyl chloride (2.38 g., 0.01 mole) in 30 ml. of 1,2-dichloroethane. After these ingredients are agitated for 5 min., the polymer is precipitated, collected, washed with water, and dried. The yield of poly[(9-fluorenylidene)di-p-phenylene 5-chloroisophthalate], white in color, is 4.75 g., $\eta_{inh}$=0.93. The product softens somewhat at 355° C., but does not stick to a heating bar at this temperature.

EXAMPLE IX

This example illustrates the preparation of poly[(9-fluorenylidene)di-p-phenylene adipate].

A polymerization mixture comprising 9,9-bis(4-hydroxyphenyl)fluorene (3.5 g., 0.01 mole), 7.86 ml. of aqueous sodium hydroxide (containing 0.208 g. sodium hydroxide/ml.), tetraethylammonium chloride monohydrate (1.5 g.), 120 ml. of water, adipyl chloride (1.83 g.; 0.01 mole), and 30 ml. of 1,2-dichlorethane, is polymerized by the method described in Example VIII, above, but 0.37 g. of adipyl chloride is added after the polymerization has proceeded for 5 minutes, after which the polymerization is allowed to proceed for 3 additional minutes. There is obtained poly[(9-fluorenylidene)di-p-phenylene adipate], 4.51 g., $\eta_{inh}$=0.97, Tg.=166° C. A clear, flexible film is cast from an 8% solution in chloroform.

Properties of other polyesters and copolyesters of this invention are summarized below in Table I, Parts 1 and 2. The polymers are prepared by the general procedures of the preceding examples, as noted in the Table under the heading "Preparative Procedure, Example." The column entitled "Film," taken in conjunction with the appropriate entry from the Legend section of the table, indicates the manner in which clear, flexible films are prepared from the appropriate polymer. Each of the polymers consists of recurring units of the following formula:

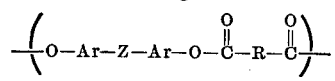

the designation of Z being shown for each example, the designation Ar representing p-phenylene, and the designation R, the portion of the polymer derived from a dibasic acid, being denoted by the name of the acid (or acids) whose dichloride(s) is utilized in the particular synthesis.

TABLE I (PART 1)

| Example | Z | R | Polymer, softening temperature, °C. | Tg, °C. | Film | $\eta_{inh}$ | Percent yield | Preparative procedure, Example |
|---------|---|---|---|---|---|---|---|---|
| X | 9-fluorenone-ylidene | Terephthalic Acid | >360 | 297 | | 0.53 | 92 | VIII |
| XI | 9-fluorenylidene | Succinic Acid | 350 | 234 | A | 1.04 | 97 | IX |
| XII | 9-fluorenylidene | Glutaric Acid | 264 | 207 | | 0.89 | 92 | IX |
| XIII | 9-fluorenylidene | Suberic Acid | 190 | 158 | A | 0.54 | 92 | IX |
| XIV | 9-fluorenylidene | Azelaic Acid | 181 | 150 | | 0.59 | 98 | IX |
| XV | 9-fluorenylidene | Sebacic Acid | 166 | 151 | B | 0.60 | 100 | VIII |
| XVI | 9-fluorenylidene | Undecandioic Acid | 158 | 136 | C | 1 0.41 | 88 | IX |
| XVII | 9-fluorenylidene | Dodecandioic Acid | 180 | 117 | D | 0.78 | 94 | IX |

TABLE I (PART 2)

| Example | Z | R | Polymer softening temperature, °C | Film | η_inh | Percent yield | Preparative procedure, Example |
|---|---|---|---|---|---|---|---|
| XVIII | xanthene (dimethyl) | Sebacic Acid | 186 | E | 0.59 | 96 | IX |
| XIX | anthrone (dimethyl) | Succinic Acid | 252 | F | 0.60 | 87 | IX |
| XX | anthrone (dimethyl) | Adipic Acid | 242 | G | 0.64 | 94 | IX |
| XXI | anthrone (dimethyl) | Sebacic Acid | 232 | E | 1.12 | 98 | IX |
| XXII | anthrone (dimethyl) | Dodecandioic Acid | 206 | | 1.42 | 100 | IX |
| XXIII | anthrone (dimethyl) | Isophthalic Acid | 340 | | 1.99 | 95 | IX |
| XXIV | anthrone (dimethyl)/fluorene (dimethyl) | (40/60) Terephthalic Acid | >360 | | 0.76 | 94 | VIII |
| XXV | fluorene (dimethyl) | Isophthalic Acid | >360 | | 0.77 | 100 | V |
| XXVI | fluorene (dimethyl) | 5-tert.-butylisophthalic Acid | 350 | | 0.49 | 95 | VIII |
| XXVII | fluorene (dimethyl) | Isophthalic/Terephthalic Acids (80/20) | >360 | | 1.34 | 97 | VIII |
| XXVIII | fluorene (dimethyl) | Terephthalic/Sebacic Acids (60/40) | 350 | | 0.74 | 91 | VIII |

[1] Measured in m-cresol.

NOTE:
A. Cast from a 10% solution in tetrahydrofuran.
B. Cast from a 8% solution in chloroform.
C. Melt pressed at 160° C.
D. Melt pressed at 175° C.
E. Cast from a 15% solution in tetrahydrofuran.
F. Cast from a 5% solution in a mixture of chloroform and trifluoroacetic acid (1/1 by volume).
G. Cast from a 20% solution in tetrahydrofuran.

EXAMPLE XXIX

This example illustrates the preparation of fibers of poly[(9-fluorenylidene)di - p - phenylene terephthalate] and of poly[(9 - fluorenylidene)di - p - phenylene isophthalate] by dry spinning.

Part A

A quantity of poly[(9-fluorenylidene)di - p - phenylene terephthalate], $\eta_{inh}=0.72$, prepared by the procedure of Example V, is dissolved in chlorobromomethane to form a spinning solution containing 15% solids. This solution, maintained at 65°–67° C., is extruded under a pressure of 80 lb./in.$^2$ through a heated (65–69° C.) spinneret having 5 holes of 0.005 inch diameter into a drying column whose walls are kept within the range of 75°–98° C. and which is swept with a co-current flow (4.5 ft.$^3$/min.) of dry nitrogen which enters the column at 75° C. After a finish solution is applied to the emerging filaments, they are wound up on a bobbin at a rate exceeding 100 yd./min. The freshly extruded fiber exhibits the following tensile properties: T/E/Mi/den.: 0.82/14/22/11.4; shrinkage in boiling water (30 min. treatment) is only 0.13%. The boiled-off fiber exhibits $TR_{3,5}=95,82$; $WR_{3,5}=76,51$. The freshly extruded fiber does not relax, stick, or visibly change when placed on a hot bar maintained at 365° C.

Part B

A quantity of poly[(9 - fluorenylidene)di-p-phenylene terephthalate], $\eta_{inh}=0.81$, prepared by the procedure of Example V, is dissolved in a mixture of 1,2-dichloroethane and trifluoroacetic acid (90/10 by volume) to form a spinning solution containing 18% solids. From this solution, extruded in a manner similar to that described in Part A, above, is obtained a fiber which exhibits the following tensile properties: T/E/Mi/Den.:

0.79/7.6/25/9.7

After this freshly extruded fiber is drawn 2.4× over a 3-inch plate maintained at 340° C., it exhibits the following tensile properties: T/E/Mi/Den.:

1.78/29/30/2.65

Part C

A quantity of the poly[(9-fluorenylidene)di-p-phenylene isophthalate] described in Example XXV is dissolved in tetrahydrofuran to form a spinning solution containing 25% solids. This solution is extruded in a manner similar to that described in Part A, above, to produce a fiber having the following tensile properties: T/E/Mi/Den.: 0.5/2.6/24/19.9 (values for boiled off sample).

The data in the following Table II illustrate the excellent thermal stability of fibers prepared from polymers of this invention, as well as the improvements which are achieved in their tensile properties when the fibers are subjected to the heat-setting treatments indicated. For this demonstration, undrawn fiber samples prepared as described in the preceding Example XXIX are wound on small, stainless steel bobbins which are placed in a hot air oven maintained at 300° C. Samples are removed at selected intervals, allowed to reach equilibrium with room temperature and humidity, and their tensile properties determined. Any exceptions to these procedures are noted in the table. The pre-exposure tensile properties of these filaments are also included in the table.

TABLE II.—FIBER THERMAL STABILITY DATA

| Example | Fiber source, Example | Pre-exposure tensile properties | | | Exposure time at 300° C. | Post-exposure tensile properties | | |
|---|---|---|---|---|---|---|---|---|
| | | T | E | Mi | | T | E | Mi |
| | XXIX-A | 0.82 | 14 | 22 | | | | |
| XXX-A[a] | XXIX-A | | | | 3 days | 1.13 | 11 | 23 |
| XXX-B | XXIX-A | | | | 4 days | 1.27 | 18 | 22 |
| XXX-C | XXIX-A | | | | 6 days | 1.15 | 8 | 22 |
| | XXIX-B | 0.79 | 7.6 | 25 | | | | |
| XXXI-A[a] | XXIX-B | | | | 5 min | 1.07 | 36 | 23 |
| XXXI-B | XXIX-B | | | | 15 min | 1.07 | 40 | 23 |
| XXXI-C | XXIX-B | | | | 1 hr | 1.19 | 48.6 | 23.7 |
| XXXI-D | XXIX-B | | | | 2 hr | 1.12 | 40.6 | 23.2 |
| XXXI-E | XXIX-B | | | | 4 hr | 0.98 | 19 | 20.5 |
| XXXI-F | XXIX-B | | | | 1 hr.[b] | 0.99 | 14 | 23.8 |
| XXXI-G | XXIX-B | | | | 1 hr.[c] | 1.19 | 23.8 | 24.7 |

[a] Test fibers XXX A–C were unscored prior to exposure, test fibers XXXI A–G were scoured prior to exposure.
[b] Fiber wound on aluminum cone.
[c] Fiber was drawn 2.0X at 335° C. prior to exposure; fiber wound on aluminum cone.

EXAMPLE XXX

This example illustrates the preparation of random polycarbonates of this invention.

Part A 9,9-bis(4-hydroxyphenyl)fluorene (2.80 g., 0.008 mole), 2,2-bis(4-hydroxyphenyl)propane (0.256 g., 0.002 mole), 3.93 ml. of a 20% aqueous solution of sodium hydroxide, tetraethylammonium chloride monohydrate (1.5 g.), 30 ml. of 1,2-dichlorethane, and 120 ml. of water are warmed together on a steam bath until all solids dissolve. The ingredients are cooled, placed in a blender, and agitated therein. Phosgene is then bubbled in until the system becomes acidic (this requires about 1 min.). Aqueous 20% sodium hydroxide is added until the system is alkaline, whereupon phosgene is bubbled in until the system is again acidic. The polycarbonate is precipitated by adding, with stirring, a volume of hexane equivalent to that of the contents of the blender. The solid is isolated by filtration, washed well with water, and dried. There is obtained poly[(9-fluorenylidene)di-p-phenylene/(isopropylidene)di-p-phenylene carbonate], (80/20), having a softening temperature greater than 360° C., $\eta_{inh}=0.56$.

Table III, below, lists properties of additional polycarbonates obtained by use of the general procedure of the previous paragraph (except for E wherein half the concentrations of bisphenols was employed). These are prepared from mixtures of bisphenols used in the molar proportions indicated; the designations of Z and Y are shown for the bisphenolic reactants. These polycarbonates are soluble in tetrahydrofuran and dichloromethane.

TABLE III.—RANDOM POLYCARBONATES

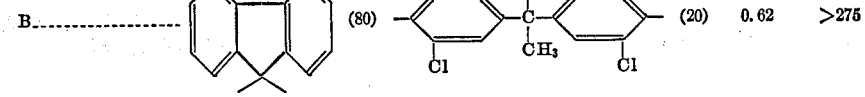

| Part: | Bisphenols | | Polycarbonates | |
|---|---|---|---|---|
| | HO—Ar—Z—ArOH (—Z—) | HO—Y—OH (—Y—) | $\eta_{inh}$ | Polymer softening temperature, °C |
| B | (fluorenylidene) (80) | (tetrachlorobisphenol A) (20) | 0.62 | >275 |

TABLE III.—Continued

| | Bisphenols | | Polycarbonates | |
|---|---|---|---|---|
| | HO—Ar—Z—ArOH | HO—Y—OH | | Polymer softening temperature °C. |
| | —Z— | —Y— | $\eta_{inh}$. | |
| C | (fluorene-9,9-diyl dimethyl) (80) | —C₆H₄—CO—C₆H₄— (20) | 0.50 | >265 |
| D | { (70) / O (30) } | (None) | 0.48 | >265 |
| E | { (60) / O (40) } | (None) | 0.4 | 299 |

What is claimed is:

1. A linear polymeric polyester consisting essentially of recurring structural units of the formula:

$$(-O-Ar-Z-Ar-O-\overset{O}{\underset{\|}{C}}-R-\overset{O}{\underset{\|}{C}}-)$$

in which Ar is p-phenylene and Z represents a gem-bivalent radical having 1 to 2 aromatic hydrocarbon rings and a gem-bivalent non-aromatic ring selected from the group consisting of a ring of 5 carbon atoms, a ring of 6 carbon atoms one of which carbon atoms may bear an oxo oxygen atom, and a ring of 5 carbon atoms and one oxygen atom, said gem-bivalent non-aromatic ring being fused to said aromatic hydrocarbon rings, R is a divalent organic radical containing from 4 to 15 carbon atoms and up to 4 atoms selected from the group consisting of halogen, oxygen and sulfur, said polymer having an inherent viscosity of at least about 0.40 as determined at 30° C. from a 0.5% solution in a mixture of sym-tetrachloroethane and phenol (40/60) by weight.

2. The polymer of claim 1 in the form of a fiber.
3. The polymer of claim 1 wherein —Z— is

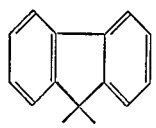

and R is p-phenylene.

4. The polymer of claim 1 wherein —Z— is

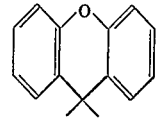

and R is tetramethylene.

References Cited

UNITED STATES PATENTS

| 3,110,698 | 11/1963 | Laakso et al. | 260—47(C) |
| 3,216,970 | 11/1965 | Conix | 260—47(C) |
| 3,036,039 | 5/1962 | Howe | 260—47(X) |
| 2,754,285 | 7/1956 | Petropoulor | 260—75(Ep) |
| 3,128,264 | 4/1964 | Laakso et al. | 260—47X |

FOREIGN PATENTS

| 172,775 | 8/1965 | U.S.S.R. | 260—47(C) |

OTHER REFERENCES

Doklady Chemistry Proceedings of the Academy of Sciences, U.S.S.R., Chem. section 160, No. 1, (Russian) pp. 119–122, 1965.

English translation of Doklady cited above, Chem. section 160, pp. 22–25 (1965). Jan.-Feb.

Hackh's Chemical Dictionary, third ed. published Philadelphia, Pa., The Blakiston Company, 1944, title page and page 607.

WILLIAM H. SHORT, Primary Examiner

L. P. QUAST, Assistant Examiner

U.S. Cl. X.R.

260—30.4, 30.8, 31.2, 32.6, 32.8, 33.4, 33.8, 345.2, 345.6, 463, 590